United States Patent

Chatthata et al.

[11] Patent Number: 5,593,933
[45] Date of Patent: Jan. 14, 1997

[54] REFRACTORY OXIDES BASED SILVER-TUNGSTEN LEAN-NOX CATALYST

[75] Inventors: Mohinder S. Chattha, Northville; Robert J. Kudla, Warren, both of Mich.

[73] Assignee: Ford Motor Company, Dearborn, Mich.

[21] Appl. No.: 521,500

[22] Filed: Aug. 30, 1995

[51] Int. Cl.[6] .............................. B01J 23/30; B01J 23/50
[52] U.S. Cl. ........................ 502/317; 502/305; 502/415
[58] Field of Search .................................. 502/254, 305, 502/317, 415

[56] References Cited

U.S. PATENT DOCUMENTS

| | | | |
|---|---|---|---|
| 3,200,063 | 8/1965 | Wilson | 200/111 |
| 4,237,032 | 12/1980 | Evans et al. | 252/462 |
| 4,500,650 | 2/1985 | Wyatt et al. | |
| 4,766,105 | 8/1988 | Lauritzen | 502/216 |
| 4,912,077 | 3/1990 | Lachman et al. | 502/302 |
| 5,100,859 | 3/1992 | Gerdes et al. | 502/439 |
| 5,128,305 | 7/1992 | Yoshimoto et al. | 502/243 |
| 5,316,991 | 5/1994 | Subramanian | 423/245.3 |
| 5,318,760 | 6/1994 | Subramanian | 423/239.2 |
| 5,399,324 | 3/1995 | Subramanian | 423/213.7 |

FOREIGN PATENT DOCUMENTS 2242142  3/1975  France.

*Primary Examiner*—Glenn A. Caldarola
*Assistant Examiner*—Alex Ghyka
*Attorney, Agent, or Firm*—Lorraine S. Melotik

[57] ABSTRACT

This invention is a catalyst for treating the exhaust gases produced during lean-burn engine operation, the gases comprising nitrogen oxides, carbon monoxide and hydrocarbons. The catalyst comprises a support material comprising gamma-alumina, a layer of about 0.01 to 1.5 wt. % tungsten deposited onto the support followed by a layer of about 1 to 3 wt. % silver, both being individually based on the weight of the support material.

7 Claims, 2 Drawing Sheets

REFRACTORY OXIDES BASED SILVER-TUNGSTEN LEAN-NOX CATALYST

FIELD OF THE INVENTION

This invention is directed to lean-burn engine catalysts comprising tungsten and silver on a porous support material comprising γ-alumina.

BACKGROUND OF THE INVENTION

A number of catalysts have been suggested to convert engine exhaust gas components like carbon monoxide, hydrocarbons and nitrogen oxides into other gases. The first two are desirably oxidized to water and carbon dioxide while the nitrogen oxides present in the exhaust gas, generally nitric oxide, are desirably reduced to nitrogen gas. These so called "three-way" catalysts achieve simultaneous efficient (conversion >80%) removal of carbon monoxide, hydrocarbons, and nitrogen oxides when the fuel mixture of an internal combustion engine is slightly "rich" in fuel, i.e., in a narrow A/F ratio range between about 14.7 and 14.4, and the exhaust is slightly reducing. Generally, these catalysts comprise a precious metal like platinum carried on an alumina support material.

Such three-way catalysts are not efficient, however, in the reduction of nitrogen oxides when engines are operated on the lean (reduced fuel) side where the A/F ratio is greater than 14.7, generally 19–27, and the exhaust gas is richer in oxygen. It is desirable, however, to operate engines on the lean side, at least part of the time, to realize a benefit in fuel economy, estimated to be in the range of 6–10%.

Zeolite based catalysts have been suggested for lean-burn operation. These zeolite based catalysts, as compared to alumina based catalysts, need to be placed further away from the engine since zeolite is not as durable as alumina under the high operating temperatures near the engine. As a result, these catalysts take longer to reach operating temperatures and hence are less efficient during cold start than three-way catalysts.

U.S. Pat. No. 5,399,324 commonly assigned with the present invention, describes a two-stage catalyst system useful for lean burn engines where the exhaust gas is exposed to the first-stage of tungsten on alumina and then to the second-stage of noble metal. It would be desirable if a durable catalyst were available which did not involve two-stages of catalysts and had good nitrogen oxide conversion efficiency under lean burn conditions. The present invention catalyst provides such a catalyst.

DISCLOSURE OF THE INVENTION

This invention is a lean-burn engine catalyst for promoting oxidation-reduction reactions of exhaust gases containing nitrogen oxides, carbon monoxide, and hydrocarbons, the catalyst comprising:

a support material comprising more than 50% by weight γ-alumina, a layer of tungsten deposited on said support material, the tungsten comprising between about 0.01 and 1.5 weight percent based on the weight of said support material, and a layer of silver deposited on the support material carrying tungsten, the silver comprising between about 1 and 3 weight percent based on the weight of said support material.

Preferably, the tungsten is about 1 weight percent of the support material and the silver is about 2 weight percent of the support material. According to another embodiment of the invention, it is a method for making the catalyst disclosed above. According to yet another embodiment, it is a method for treating exhaust gases using the catalyst disclosed above.

DESCRIPTION OF THE PREFERRED EMBODIMENTS

Figure 1:
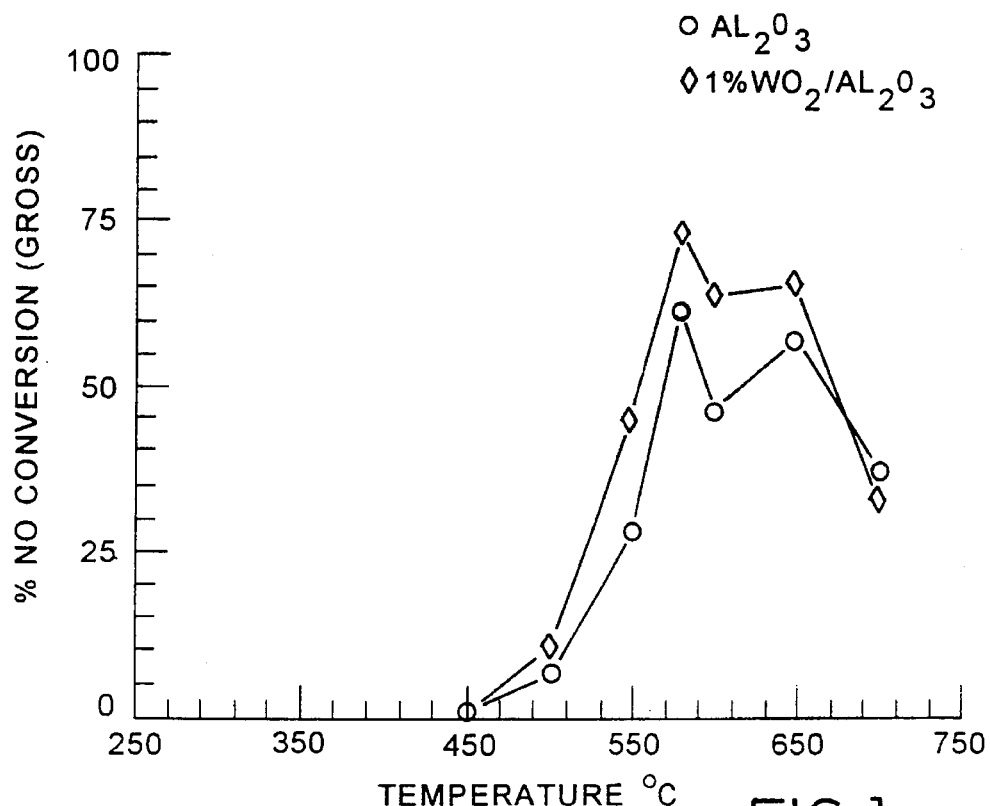
FIG. 1 graphically illustrates the effect of 1% tungsten loading alumina on NOx conversion.

The catalyst of this invention comprises two metals carried on a refractory oxide porous support. It is useful for efficiently converting exhaust gases containing nitrogen oxides, carbon monoxide, and hydrocarbons produced during lean-burn operation. In particular, the catalyst comprises a porous support material loaded with a layer of tungsten and then silver.

The support material is a refractory oxide comprising more than 50% by weight γ-alumina (hereafter "γ-alumina support material). This support material, is particularly preferred because it has high surface area, good adhesion and high thermal stability. The support material comprises more than about 50% by weight, more preferably greater than 80%, and most preferably substantially all γ-alumina. In addition to the γ-alumina, however, if desired, the γ-alumina support material may comprise other materials like cerium oxide, barium oxide, zirconium oxide, lanthanum oxide, titanium oxide, and α-alumina, theta-alumina, and silica. This support material is generally employed for testing in granular form and preferably has a particle size in the range of 20–100 mesh, although particle size is not critical.

To make the catalyst according to the present invention, the metals are provided onto the support in a particular order, i.e., the tungsten is provided first followed by silver. Between about 0.01 and 1.5 weight percent tungsten is deposited on the alumina. Thereafter, onto this tungsten carrying support, a layer of silver is deposited in an amount of between about 1 and 3 weight percent based on the weight of the support material. Preferably, the catalyst comprises about 1% by weight tungsten and 2% by weight silver, both independently based on the weight of the support material.

The catalyst materials may be provided on the support according any procedure, one common method being the well known technique of incipient wetness According to this technique, the tungsten may be provided on the γ-alumina support by impregnating the γ-alumina support material with an aqueous or organic solvent solution comprising a tungsten containing compound. Any tungsten compound which is soluble in an aqueous or organic medium and whose functional group is capable of being decomposed by heat to leave only tungsten or its oxide on the support material may be employed in this invention. Exemplary of suitable tungsten containing compounds are tungstates such as ammonium metatungstate, metatungstic acid, tungstyl acetylacetonate, and tungsten hexahalides. Particularly preferred is ammonium metatungstate. Other tungsten compounds useful in this invention in addition to those listed above will be apparent to those skilled in the art in view of this disclosure. According to such techniques, the compound, in this case a tungsten compound, is dissolved generally by simply mixing the compound into an aqueous or organic solvent to make a solution thereof. Any suitable solvent can be employed. Exemplary of such solvents are water, solution of alkalis like sodium hydroxide, ethanol, toluene, isopropyl alcohol, acetone, methylethylketone, burylacerate, and dimethylformamide. A solution of the tungsten compound, is made as described above, is generally further diluted for impregnation. The catalyst solution may also comprise a mixture of compatible organic solvents and/or compatible tungsten compounds.

In the case of a granular support, a mixture of the granular material and solution may be stirred at an elevated temperature, generally of about 75°–120° C. to evaporate the solvent. Thereafter, the silver layer may be deposited using similar incipient wetness techniques with silver compounds soluble in a solvent. Exemplary of useful silver compounds are silver nitrate, acetate, citrate, and lactate. Silver nitrate is particularly preferred.

According to this technique for depositing the metals, following impregnation and drying of the support carrying the tungsten and silver, this catalyst is optimally calcined at an elevated temperature preferably about 500° C. for 4–5 hours in order to decompose silver salts to produce silver and silver oxide at the surface.

For useful application in an exhaust system, this catalyst will be carried on a substrate of a thermally stable, electrically insulating material. Typical of such substrate materials are cordierite, mullite, etc. The substrate may be in any suitable configuration, often being employed as a monilithic honeycomb structure, spun fibers, corrugated foils or layered materials. Still other materials and configurations useful in this invention and suitable in an exhaust gas system will be apparent to those skilled in the art of view of the present disclosure. To provide the present invention catalyst onto the substrate, a slurry of the support/tungsten/silver may be washcoated onto the substrate and then calcined at an elevated temperature, e.g., about 500° C. for 4–5 hours. Alternately, the tungsten and silver may be coated directly onto a substrate coated with γ-alumina support material. Still further, a tungsten coated washcoat may be applied to a substrate and then the silver coated thereon. Preferably, alumina is washcoated on the monolith and dyed, then ammonium tungsten solution is applied allowed by drying and calination. Silver is then applied and calcined at 500° C. for 4–5 hours. The support material is preferably washcoated as a slurry onto a ceramic monolith and then impregnated with tungsten followed by silver.

It is believed by the inventors that the tungsten applied to the alumina support modifies alumina to make it more acidic and hence improves its nitrogen oxide (NOx) conversion ability. The tungsten thus needs to be applied first to the gamma-alumina support material. Thereafter the silver is deposited to further improve the nitrogen oxide conversion efficiency. Neither the validity nor understanding of this theory is necessary for the practice of this invention.

TEST PROCEDURE

The catalysts shown in the figures are described in detail in the Examples below. They were tested by subjecting them to a gas stream in a quartz flow reactor. Gases are blended in a manifold by means of massflow controllers, routed through either a bypass line or through the reactor. The gas is configured to resemble a lean-burn engine exhaust gas, i.e. excess oxygen as compared to stoichiometric. The gases later flow to an analytical train for analysis. The post-catalyst gases are then analyzed to determine the extent of reaction on various constituents. The catalyst used herein is in the form of a powder. Total gas flow over the catalyst is 3.0 liters/minute.

Figure 2:
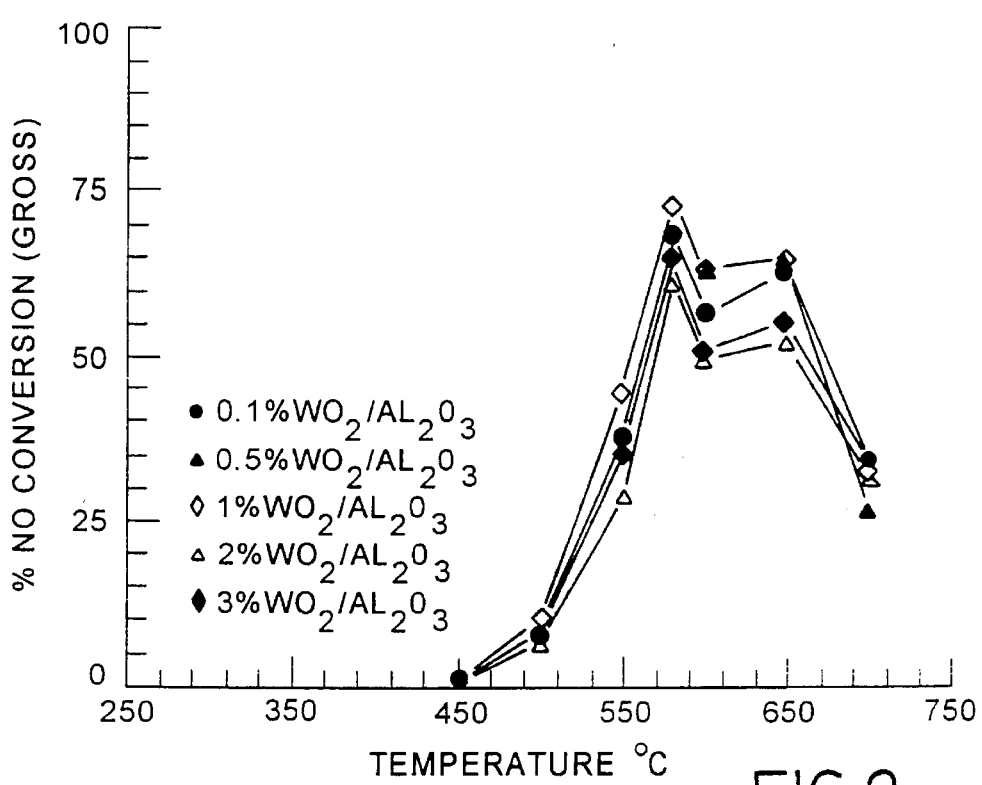
FIG. 2 graphically illustrates the effect of varying levels of tungsten loading on alumina on NOx conversion.

FIG. 1 graphically shows the nitrogen oxide conversion (under lean-burn conditions) for γ-alumina (alone) and for a 1% tungsten on γ-alumina (both are comparative examples not according to the present invention). FIG. 2 graphically shows nitrogen oxide conversion for various loadings of only tungsten on γ-alumina (comparative examples not according to the present inventor). For the tests of these two figures, the field gas flow rate=300 cc/minute, space velocity=9800h$^{-1}$, R value=0.24, $C_3H_8$=500 ppm, $C_3H_6$=1000 ppm, CO=4000 ppm, $H_2$=1333 ppm, NO=500 ppm, $O_2$=40,000 ppm, $SO_2$=20 ppm, $CO_2$=12%, $H_2O$=10%. The redox ratio R is the ration of the reducing to the oxidizing components in the feed gas.

FIGS. 1 and 2 show that optimal nitrogen oxide conversion takes place when the tungsten loading is about 1% on the support.

Figure 3:
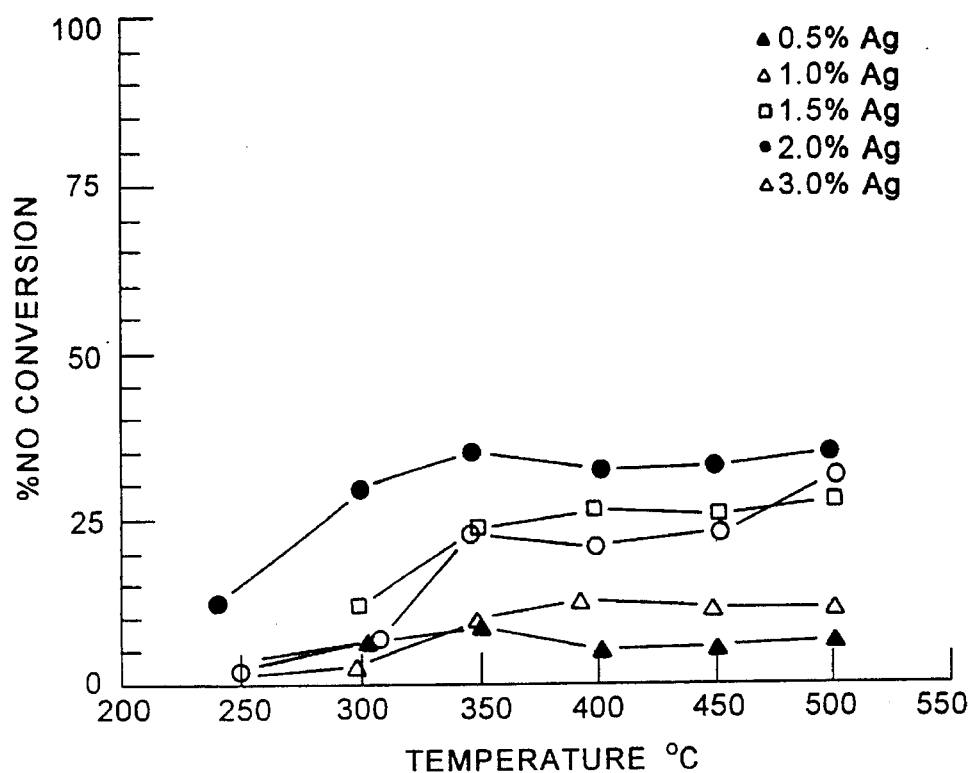
FIG. 3 graphically illustrates the effect of different loadings of silver on alumina on NOx conversion.

FIG. 3 graphically shows the nitrogen oxide conversion at lean-burn simulation for various silver loadings on γ-alumina ($Al_2O_3$—C, 60–100 mesh), these not being catalysts according to the present invention. It can be seen from this figure that optimal silver loading is at about 2.0% Ag. For these tests, the feed gas flow rate=3000 cc/min, space velocity=25,000 hr$^{-1}$, sample size=1.0 g, $C_3H_8$=222 ppm, $C_3H_6$=445 ppm, CO=1500 ppm, $H_2$=500 ppm, NO=500 ppm, $O_2$=8%, $SO_2$=15 ppm, $CO_2$=9%, $H_2O$=7.5%.

Figure 4:
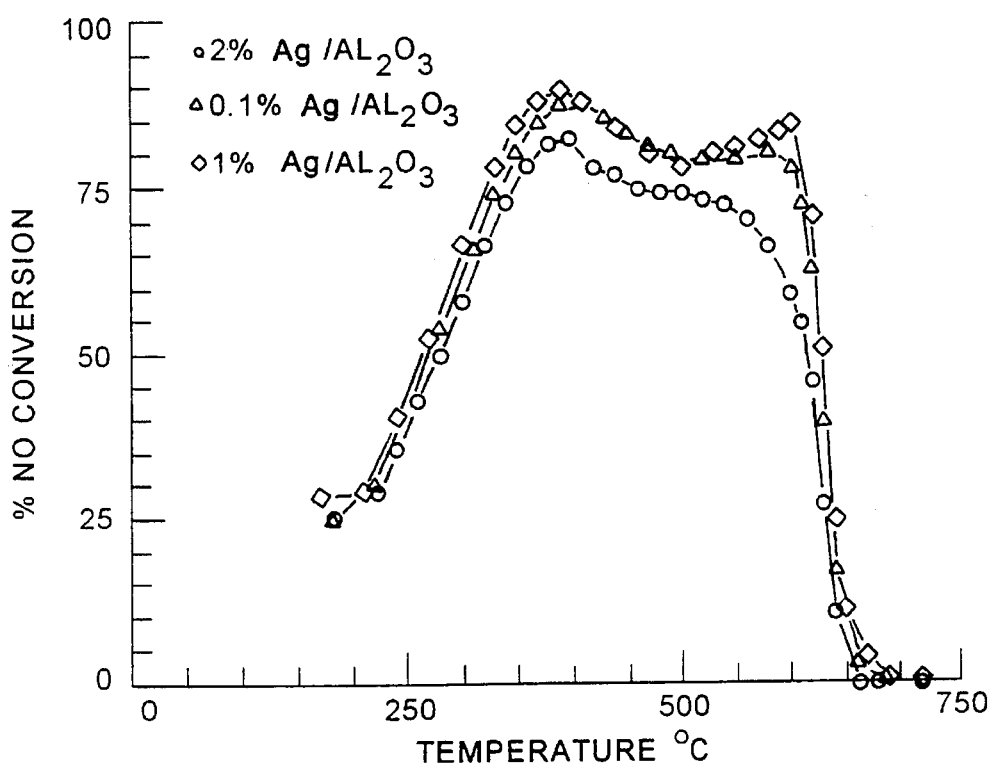
FIG. 4. graphically illustrates a comparison of NOx conversion for $Ag/Al_2O_3$ vs. $Ag/W/Al_2O_3$.

FIG. 4 graphically shows that embodiments of catalysts accordingly to the present invention which include tungsten and silver on γ-alumina support material ($Al_2O_3$—C, 2.8 g) have a significantly improved nitrogen oxide conversion (%) as well as a broader operating temperature range as compared to (just W on alumina or Ag on alumina) (FIGS. 1 & 4). It can be seen that the optimal embodiment which includes 1% tungsten and 2% silver verifies the findings of the work displayed in FIGS. 2 and 3. The field gas had the same parameters as that used for the work of FIGS. 1 and 2.

EXAMPLES

Example 1

γ-alumina (alumina-C, Degussa Corp.) is made into a slurry in acidified water (4% $HNO_3$). The slurry is stirred at room temperature for sixteen hours, dried overnight at 110° C. and then calcined at 600° C. for four hours. The dried material is crushed and sieved to obtain particles of 20–40 mesh.

Ammonium metatungstate (267 g) is dissolved in 1,000 ml. distilled water. The volumes of this solution listed below are employed for impregnation of 30 g of 20–60 mesh alumina in each case.

| Sample | Vol. of ammonium metatungstate solution (ml) | % WO₃ |
|---|---|---|
| A | 0.09 | 0.1 |
| B | 0.45 | 0.5 |
| C | 0.90 | 1–0 |
| D | 1.80 | 2–0 |
| E | 2.70 | 3.0 |

In each case, the volume was diluted to 42 ml. with distilled water and employed to impregnate 30 g of 20–40 mesh alumina by incipient wetness technique. The samples are allowed to stay at room temperature overnight. The materials are dried at 100° C. for three hours and then calcined at 500° C. for four hours.

Six grams of each of the samples are impregnated by incipient wetness technique with aqueous silver nitrate solution to deposit 2% silver (based on the support weight) on the samples. They are allowed to stay overnight at room temperature, dried at 110° C. for four hours and then calcined at 500° C. for four hours. A control sample of 2% Ag on γ-alumina is prepared by the same procedure.

The samples were evaluated in a laboratory flow reactor. As seen in FIG. 4, the samples 2% Ag/0–1%W/Al₂O₃ and 2% Ag/1%/W/Al₂O₃ show significantly higher NOx conversions that the control sample (not according to the present invention) of 2% Ag/Al₂O₃.

Example 2

A slurry is prepared from γ-alumina (45 g) and silica (5 g) and 20–40 mesh particles are prepared as described in Example 1. Two five gram samples containing 2% Ag/1%W and 2% Ag (control), are prepared and evaluated as described in Example 1. The maximum NOx conversion for the control sample is 71% while for Ag/W sample is 78%.

Example 3

Two samples are prepared (1% Ag/10%/Z,O₂/Al₂O₃ and 1% Ag/1%W/10%Z,O₂/Al₂O₃) and evaluated according to the procedure outlined in Example 1. The Ag/W sample showed 81% NO conversion while the Ag control sample showed 72% conversion.

Example 4

Support particles (20–40 mesh), containing 20% α-alumina and 80% γ-alumina are prepared according to the procedure of Example 1. Two samples containing 1%Ag and 1%Ag/0.5%/W are prepared and evaluated as outlined in Example 1. The NO conversion for the Ag only sample is 66% for the Ag/W sample it is 73%.

Example 5

Lanthana (5%) and γ-alumina (95%) particles are prepared as described in Example 1. Two samples containing 2%Ag/1%W and 2% Ag only are prepared and evaluated as described in Example 1. The NO conversion for Ag only sample is 73% while Ag/W conversion is 82%.

Example 6

According to the procedure described in Example 1, support particles (20–40 mesh) containing 7%TiO₂ and 93% γ-alumina are prepared and impregnated with silver and tungsten to obtain two samples containing 2% Ag and 2%/Ag/0.2%W. The samples are then evaluated for NO reduction as outlined in Example 1. The maximum NO conversion for Ag/W tungsten sample is 84% while for Ag only the conversion is 77%.

Example 7

The samples prepared in Example 3 are aged at 800° C. in air for 16 hours, and evaluated for NO reduction according to the procedure of Example 1. The Ag/W sample showed 72% NO conversion while the Ag only control sample showed 61% conversion.

Example 8

The experiment is carried out as in Example 2 except in the feed gas no SO₂ is included. The maximum NO conversion for the control sample is 72% while for the Ag/W sample is 81%.

Example 9

The samples are prepared and evaluated as in Example 4 except that instead of a mixture of propane and propylene, 1,500 PPM of propylene only are included in the feed gas. The NO conversion for the Ag only control sample is 69% while for the Ag/W sample it is 77%.

We claim:

1. A lean-burn engine catalyst for promoting oxidation-reduction reactions of exhaust gases containing nitrogen oxides, carbon monoxide, and hydrocarbons, the catalyst consisting essentially of:

a support material comprising more than 50% by weight γ-alumina, a layer of tungsten deposited on said support material, the tungsten comprising between about 0.01 and 1.5 weight percent based on the weight of said support material, and a layer of silver deposited on the support material carrying tungsten, the silver comprising between about 1 and 3 weight percent based on the weight of said support material.

2. The catalyst according to claim 1 wherein said tungsten is present in an amount of about 1.0 percent by weight based on the weight of said support material.

3. The catalyst according to claim 1 wherein said silver is present in an amount of about 2 percent by weight based on the weight of said support material.

4. The catalyst according to claim 1 wherein said support material consists of γ-alumina.

5. The catalyst according to claim 1 wherein said engine is an internal combustion engine.

6. The catalyst according to claim 1 wherein said support material further comprises materials selected from the group consisting of cerium oxide, barium oxide, zirconium oxide, lanthanum oxide, alpha-alumina, theta-alumina, silica, and titanium oxide.

7. A method of making a lean-burn engine catalyst consisting essentially of a support material and deposited thereon, in order, a layer of tungsten and a layer of silver, for promoting oxidation-reduction reactions of exhaust gases containing nitrogen oxides, carbon monoxide, and hydrocarbons, the method comprising the steps of:

(a) impregnating a support material (I) comprising more than 50% by weight γ-alumina and, optionally, materials selected from the group consisting of cerium oxide, barium oxide, zirconium oxide, lanthanum oxide, alpha-alumina, and titanium oxide with a solution of a tungsten containing compound in an aqueous or organic solvent to provide a layer of between about 0.01 and 1.5 weight percent tungsten based on the weight of said support material;

(b) subsequently drying the impregnated support material;

(c) depositing a layer of silver on said tungsten from a solution of a silver containing compound in an aqueous or organic solvent to provide between about 1 and 3 weight percent silver on the tungsten, the weight of silver being based on the weight of said support material;

(d) drying the support material carrying the tungsten and silver; and (e) calcining the support material carrying the tungsten and silver at a temperature of at least 400° C.

* * * * *